United States Patent
Rehfeld et al.

(10) Patent No.: US 11,712,875 B2
(45) Date of Patent: Aug. 1, 2023

(54) VISCOELASTIC PLASTIC INTERLAYER FOR VIBROACOUSTIC DAMPING AND GLAZING COMPRISING SUCH AN INTERLAYER

(71) Applicant: Saint-Gobain Glass France, Courbevoie (FR)

(72) Inventors: Marc Rehfeld, Ezanville (FR); David Fournier, Chevincourt (FR); Jean-Philippe Boure, Ribecourt (FR); Corinne Payen, Montmacq (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/829,547

(22) Filed: Dec. 1, 2017

(65) Prior Publication Data
US 2018/0079179 A1     Mar. 22, 2018

Related U.S. Application Data

(63) Continuation of application No. 13/495,018, filed on Jun. 13, 2012, now abandoned.

(30) Foreign Application Priority Data

May 22, 2012    (FR) ...................................... 12 54636

(51) Int. Cl.
    *B32B 17/10*         (2006.01)
    *B32B 7/022*         (2019.01)

(52) U.S. Cl.
    CPC ........ *B32B 17/10036* (2013.01); *B32B 7/022* (2019.01); *B32B 17/10761* (2013.01);
(Continued)

(58) Field of Classification Search
None
See application file for complete search history.

(56) References Cited

U.S. PATENT DOCUMENTS

| | | | | |
|---|---|---|---|---|
| 2,274,672 A | * | 3/1942 | Dennison | .......... B32B 17/10605 |
| | | | | 428/437 |
| 3,592,726 A | | 7/1971 | Blizard et al. | |
| | | | (Continued) | |

FOREIGN PATENT DOCUMENTS

| | | |
|---|---|---|
| FR | 2 944 521 | 10/2010 |
| JP | 06-000926 A | 1/1994 |
| JP | 2001-206742 A | 7/2001 |

OTHER PUBLICATIONS

Translation of JP2001-206742. Retrieved Feb. 2022.*
Cadogan et al., "Plasticizers," Ullmann's Encyclopedia of Industrial Chemistry, pp. 599-618, (2000).

*Primary Examiner* — Prashant J Khatri
(74) *Attorney, Agent, or Firm* — Pillsbury Winthrop Shaw Pittman LLP

(57) ABSTRACT

A viscoelastic plastic interlayer intended to be incorporated between two glass sheets to form a laminated glazing with vibro-acoustic damping properties, the interlayer comprising at least one layer made of viscoelastic plastic with vibro-acoustic damping properties, the interlayer being such that the resonant frequency $f_2$ of the second resonance mode of a laminated glazing bar with a surface area of 25 mm×300 mm composed of two glass sheets each 2.1 mm thick, between which is incorporated the interlayer, determined by measuring the mechanical impedance (MIM) at 20° C. according to standard ISO 16940, is between 760 Hz and 1000 Hz and the loss factor $\eta_2$ of the second resonance mode of the same bar, determined by MIM under the same conditions, is greater than or equal to 0.25.

21 Claims, 1 Drawing Sheet

(52) U.S. Cl.
CPC ... *B32B 2250/03* (2013.01); *Y10T 428/24967* (2015.01); *Y10T 428/31909* (2015.04)

(56) References Cited

U.S. PATENT DOCUMENTS

| | | |
|---|---|---|
| 7,829,192 B2 | 11/2010 | Boure et al. |
| 2003/0139520 A1* | 7/2003 | Toyama ............ B32B 17/10605 524/503 |
| 2006/0210776 A1* | 9/2006 | Lu ......................... G02B 27/01 428/524 |
| 2007/0148472 A1* | 6/2007 | Masaki ............. B32B 17/10981 428/426 |
| 2008/0268204 A1* | 10/2008 | Bourcier ........... B32B 17/10761 428/147 |
| 2012/0034439 A1 | 2/2012 | Milamon et al. |

\* cited by examiner

VISCOELASTIC PLASTIC INTERLAYER FOR VIBROACOUSTIC DAMPING AND GLAZING COMPRISING SUCH AN INTERLAYER

CROSS-REFERENCE TO RELATED APPLICATION

This application is a continuation of U.S. application Ser. No. 13/495,018 filed Jun. 13, 2012, which claims priority under 35 U.S.C. § 119 from French Application No. 12 54636 filed May 22, 2012, the entire contents of each of which are herein incorporated by reference.

BACKGROUND OF THE INVENTION

Field of the Invention

The invention relates to a viscoelastic plastic interlayer intended to be incorporated between two sheets of glass to form laminated glazing with vibroacoustic damping properties, intended especially for locomotive machines, in particular a motor vehicle.

Discussion of the Background

Among all the qualities contributing to comfort in modern transportation means such as trains and motor vehicles, silence has become a determining factor.

Acoustic comfort has been improved over several years now, by treating noise, such as noise from the engine, rolling or suspension noise, either at their source or during their propagation through the air or through solids, by means, for example, of absorbent coatings or elastomeric connecting pieces.

The shapes of vehicles have also been modified to improve the penetration in air and to reduce the turbulence, which are themselves sources of noise.

In recent years, attention has been focused on the role that glazing might play in improving acoustic comfort, in particular laminated glazing comprising plastic interlayer films. Laminated glazing also has other advantages, such as elimination of the risk of projection of fragments in the event of sudden breakage, constituting an effraction retarder.

It has been demonstrated that the use of standard plastic films in laminated glazing is unsuitable for improving acoustic comfort. Specific plastic films were then developed, which had damping properties that allow an improvement in the acoustic comfort.

Moreover, in the existing windscreens, the thickness of the glass sheet intended to be turned facing the exterior of the vehicle is generally 2.1 mm and the thickness of the glass sheet intended to be turned facing the interior of the vehicle is generally 1.6 mm. However, the tendency is towards lightening motor vehicles in order to reduce their consumption and the induced discharge of $CO_2$. One means is to propose lighter motor vehicle glazing. One solution for reducing the weight of glazing is to reduce the thickness of the glass sheets. However, this reduction of thickness results in a degradation of the acoustic properties of the laminated glazing.

SUMMARY OF THE INVENTION

There is thus a need for a viscoelastic plastic interlayer intended to be incorporated between two glass sheets to form a laminated glazing with vibro-acoustic damping properties, which allows a reduction of the thickness of the glass sheets without degradation of the vibro-acoustic damping properties.

To do this, the invention proposes a viscoelastic plastic interlayer intended to be incorporated between two glass sheets to form a laminated glazing with vibro-acoustic damping properties, the interlayer comprising at least one layer made of viscoelastic plastic with vibro-acoustic damping properties, the interlayer being such that the resonant frequency $f_2$ of the second resonance mode of a laminated glazing bar with a surface area of 25 mm×300 mm composed of two glass sheets each 2.1 mm thick, between which is incorporated the interlayer, determined by measuring the mechanical impedance (MIM) at 20° C. according to standard ISO 16940, is between 760 Hz and 1000 Hz and the loss factor $\eta_2$ of the second resonance mode of the same bar, determined by MIM under the same conditions, is greater than or equal to 0.25.

According to another particular feature, the layer is based on polyvinyl butyral and plasticizer.

According to another particular feature, the resonant frequency $f^2$ is between 800 and 900 Hz and preferably between 800 Hz and 850 Hz.

According to another particular feature, the loss factor $f_2$ is greater than 0.30.

According to another particular feature, the interlayer also comprises two outer layers made of standard PVB, the layer being between the two outer layers.

According to another particular feature, the measurement of the mechanical impedance is performed at least 1 month after assembling the laminated glazing bar, the laminated glazing bar having itself been assembled at least 1 month after the manufacture of the interlayer.

The invention also relates to glazing comprising:
a glass sheet between 0.5 mm and 2.6 mm thick,
a glass sheet between 0.5 mm and 1.6 mm thick,
an interlayer described above, the interlayer being between the glass sheets,
in which the total thickness of the glass sheets is strictly less than 3.7 mm.

The invention also relates to a motor vehicle comprising glazing described above, the glass sheet between 0.5 mm and 2.6 mm thick being turned facing the exterior of the vehicle and the glass sheet between 0.5 mm and 1.6 mm thick being turned facing the interior of the vehicle.

The invention also relates to the use of the glazing described above as a motor vehicle windscreen.

BRIEF DESCRIPTION OF THE DRAWINGS

Other characteristics and advantages of the invention will now be described with regard to the drawings, in which.

DETAILED DESCRIPTION OF THE PREFERRED EMBODIMENTS

The invention relates to a viscoelastic plastic interlayer intended to be incorporated between two glass sheets to form laminated glazing with vibro-acoustic damping properties. The interlayer comprises at least one layer made of viscoelastic plastic with vibro-acoustic damping properties.

The interlayer is such that the resonant frequency $f_2$, of the second resonance mode of a laminated glazing bar with a surface area of 25 mm×300 mm composed of two glass sheets each 2.1 mm thick, between which is incorporated the interlayer, determined by measuring the mechanical impedance (MIM) at 20° C. according to standard ISO 16940 (with only one difference concerning the thickness of the glass sheets of the bar, which is 2.1 mm instead of 4 mm), is between 760 Hz and 1000 Hz and the loss factor $\eta_2$ of the second resonance mode of the same bar, determined by MIM under the same conditions, is greater than or equal to 0.25.

The inventors have demonstrated, as will be seen later, that an interlayer comprising these characteristics makes it possible to obtain thinned laminated glazing whose acoustic performance qualities are equivalent or even superior to those of laminated glazing with standard thicknesses of glass incorporating a known interlayer with improved acoustic properties.

The interlayer according to the invention is intended to be incorporated between two glass sheets to form laminated glazing.

Figure 2:
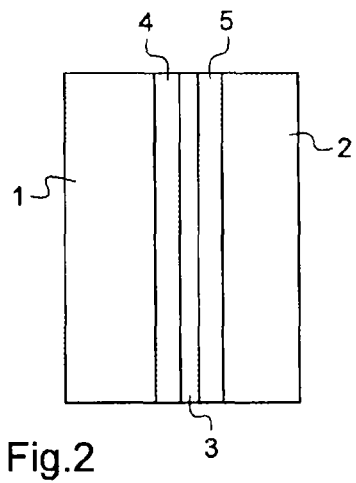
FIG. 2 shows a view in cross section of glazing according to the invention.

FIG. 2 shows a view in cross section of glazing according to the invention.

The glazing comprises two glass sheets, 1, 2 between which is inserted the interlayer according to the invention. The solid connection of the interlayer to the glass sheets is made by known means, for example by stacking the glass sheets and the interlayer and by passing the assembly into an autoclave.

The glass sheet 1 of the glazing is intended to be turned facing the exterior of the vehicle, whereas the glass sheet 2 is intended to be turned facing the interior of the vehicle. The glass sheet 1 is preferably thicker than the glass sheet 2 such that the glazing affords better protection against external attack (inclement weather, projection of gravel, etc.). Specifically, the thicker the glass, the greater its mechanical strength. However, the thicker the glass is, the heavier it is. A compromise must thus be found between the mechanical strength and the weight of the glazing. Thus, the thickness of the glass sheet 1 is, for example, between 0.5 mm and 2.6 mm and preferably between 1.4 mm and 2.0 mm, and the thickness of the glass sheet 2 is, for example, between 0.5 mm and 1.6 mm and preferably between 1.1 mm and 1.5 mm.

In the existing glazing, the thickness of the glass sheet 1 is generally 2.1 mm and the thickness of the glass sheet 2 is generally 1.6 mm, i.e. a total glass thickness of 3.7 mm.

The glazing according to the present invention comprises a total glass thickness strictly less than 3.7 mm, preferably less than or equal to 3.2 mm.

Preferably, according to the invention, the thickness of the glass sheet 1 is 1.8 mm and the thickness of the glass sheet 2 is 1.4 mm so as to limit the weight of the glazing, which makes it possible to reduce the consumption of fuel of a vehicle equipped with such glazing. This also makes it possible to manipulate the glazing more easily and to save on material.

The glazing according to the invention may also have a glass sheet 1 1.6 mm thick and a glass sheet 2 1.2 mm thick, or a glass sheet 1 1.4 mm thick and a glass sheet 2 1.1 mm thick.

The interlayer is constituted by at least one layer 3 made of viscoelastic plastic with vibro-acoustic damping properties. It is preferably based on polyvinyl butyral and plasticizer. The content and nature of the plasticizer and the degree of acetalization of the polyvinyl butyral make it possible to modify in a known manner the rigidity of a component based on polyvinyl butyral and plasticizer.

In the example of FIG. 2, the interlayer also comprises two layers 4, 5, referred to as outer layers, between which is inserted the layer 3.

The outer layers 4, 5 are preferably made of standard PVB. The layer 3 is less rigid than the outer layers 4, 5 so as to vibrate correctly to ensure the desired acoustic damping.

As a variant, the interlayer may comprise at least two layers made of viscoelastic plastic with vibro-acoustic damping properties, optionally surrounded by layers of standard PVB.

The acoustic characteristics of the interlayer are determined by measuring the mechanical impedance (MIM) at 20° C. according to standard ISO 16940 of a laminated glazing bar with a surface area of 25 mm×300 mm composed of two glass sheets each 2.1 mm thick (and not 4 mm thick as recommended in standard ISO 16940), between which is incorporated an interlayer according to the invention, i.e. an interlayer comprising at least one layer of viscoelastic plastic with vibro-acoustic damping properties.

MIM makes it possible to determine the resonant frequencies and the loss factors of the various resonance modes of the laminated glazing bar.

The interlayer is in accordance with the invention if the resonant frequency $f_2$ of the second resonance mode of the laminated glazing bar determined by MIM is between 760 Hz and 1000 Hz and the loss factor $\eta_2$ of the second resonance $\eta_2$ of the laminated glazing bar determined by MIM is greater than or equal to 0.25.

Preferably, the resonant frequency $f_2$ is between 800 Hz and 900 Hz, which makes it possible to have improved acoustic performance qualities while degrading less the level of weakening of the laminated glazing before the critical frequency. More preferably, the resonant frequency $f_2$ is between 800 Hz and 850 Hz, which makes it possible to have more improved acoustic performance qualities while degrading even less the level of weakening of the laminated glazing before the critical frequency.

Preferably, the loss factor $\eta_2$ is greater than 0.30, which makes it possible to have improved acoustic performance qualities while improving the acoustic damping.

The measurement of the mechanical impedance (MIM) is performed at least 1 month after assembling the laminated glazing bar, the laminated glazing bar itself having been assembled at least 1 month after the manufacture of the interlayer. This makes it possible to be sure that the interlayer and the laminated glazing have achieved stable states and thus to determine reliable values.

Figure 1:
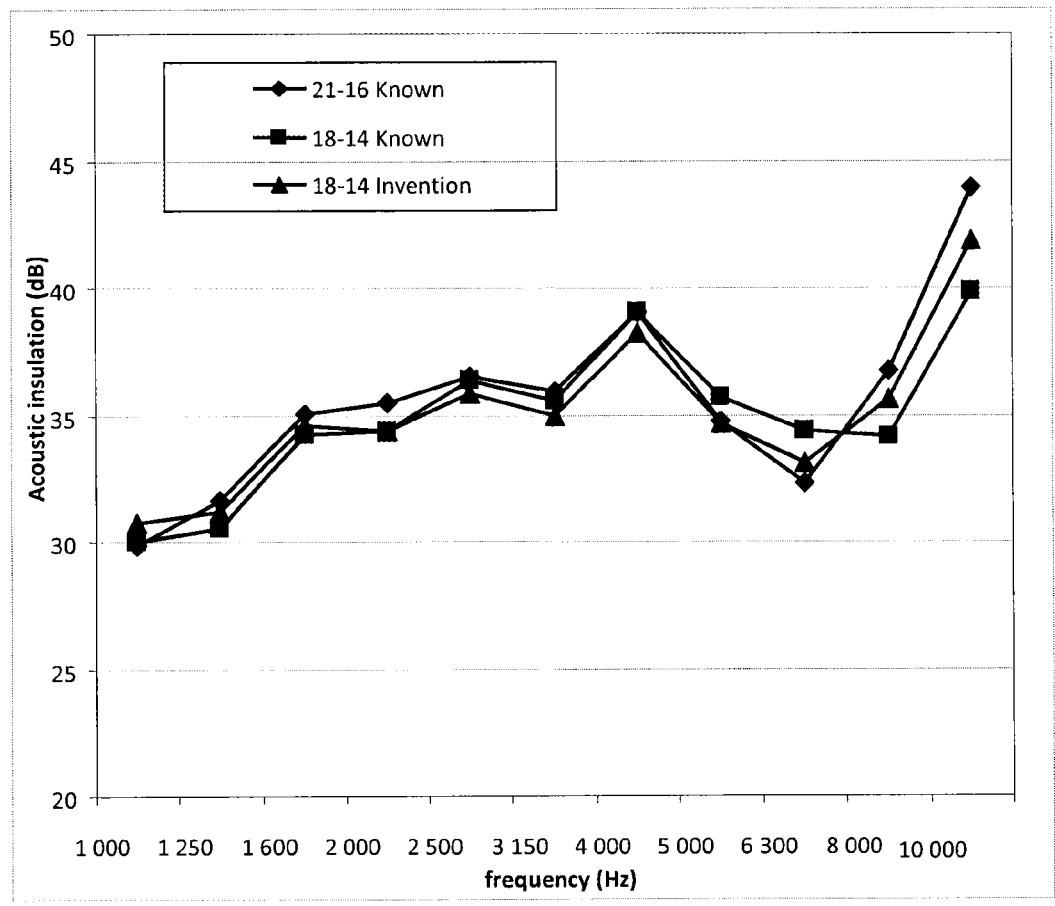
FIG. 1 shows a curve of the acoustic insulation as a function of the frequency, measured on three windscreens.

FIG. 1 shows a curve of the acoustic insulation as a function of the frequency, measured on three windscreens. The acoustic insulation of a glazing takes into account the acoustic performance qualities that may be observed on a vehicle equipped with the said glazing.

Thus, a first windscreen (21-16 known) comprises:
two glass sheets 2.1 mm and 1.6 mm thick, respectively, and
an interlayer comprising two outer layers made of standard PVB and a central layer made of viscoelastic plastic with vibro-acoustic damping properties, the interlayer having a resonant frequency $f_2$ of 675 Hz (±15 Hz) and a loss factor $\eta_2$ equal to 0.35 (±0.03).

The first windscreen corresponds to a standard windscreen with a known interlayer with acoustic damping properties.

The curve of acoustic insulation (shown as diamonds) of the first windscreen shows a dip at about 6500 Hz.

A second windscreen (18-14 known) comprises:
two glass sheets 1.8 mm and 1.4 mm thick, respectively, and
an interlayer comprising two outer layers made of standard PVB and a central layer made of viscoelastic plastic with vibro-acoustic damping properties, the interlayer having a resonant frequency $f_2$ of 675 Hz (±15 Hz) and a loss factor $\eta_2$ equal to 0.35 (±0.03).

The second windscreen corresponds to a thinned windscreen with an interlayer identical to that of the first windscreen.

The curve of acoustic insulation (shown by squares) of the second windscreen shows similar behaviour to that of the first windscreen up to about 5000 Hz, but a dip shifted towards the high frequencies, at about 8000 Hz. This shift in the dip is very troublesome since it implies that this windscreen allows aerial noise to pass at high frequencies that are irritating to the human ear.

A third windscreen (18-14 invention) comprises:
two glass sheets 1.8 mm and 1.4 mm thick, respectively, and
an interlayer comprising two outer layers made of standard PVB and a central layer made of viscoelastic plastic with vibro-acoustic damping properties, the interlayer having a resonant frequency $f_2$ of 800 Hz (±15 Hz) and a loss factor $\eta_2$ equal to 0.30 (±0.03).

The third windscreen corresponds to a thinned windscreen with an interlayer according to the invention.

The curve of acoustic insulation (shown by triangles) of the third windscreen shows behaviour similar to that of the first windscreen, with a dip centred at about 6500 Hz and acoustic insulation values similar to those of the first windscreen.

The windscreen with an interlayer according to the invention thus indeed makes it possible to compensate for the acoustic degradation associated with the thinning of the glazing.

The laminated glazing according to the invention may be used as a motor vehicle windscreen. In this case, it of course satisfies all the conditions of rule No. 43 of the United Nations (known as rule R43) of hard impact strength for ensuring its mechanical strength. To do this, in the case of an interlayer comprising two outer layers made of standard PVB, the thickness of these outer layers 4, 5 is, for example, adapted in a known manner, for example by patent application FR 09 52567.

The invention claimed is:

1. A laminated glazing, comprising:
a first glass sheet having a thickness in a range of from 0.5 to 2.6 mm;
a second glass sheet having a thickness in a range of from 0.5 to 1.6 mm, a total thickness of the glass sheets being less than 3.7 mm;
a viscoelastic plastic interlayer between the first and second glass sheets,
wherein the interlayer is incorporated between two glass sheets to form the laminated glazing with vibro-acoustic damping properties,
wherein the interlayer comprises:
an inner layer made of viscoelastic plastic with vibro-acoustic damping properties, and two outer layers consisting of standard PVB, the at least one inner layer being between the two outer layers,
wherein a resonant frequency $f_2$ of the second resonance mode of a laminated glazing bar with a surface area of 25 mm×300 mm composed of two glass sheets each 2.1 mm thick, between which is incorporated the interlayer, determined by measuring the mechanical impedance (MIM) at 20° C. according to standard ISO 16940, is in a range of from 800 to 900 Hz,
wherein the loss factor 172 of the second resonance mode of the laminated glazing bar, determined by MIM under the same conditions, is greater than or equal to 0.25,
wherein the inner layer is based on polyvinyl butyral and plasticizer,
wherein the inner layer is less rigid than the two outer layers, and
wherein for a total glass thickness of 3.2 mm and for a thickness of the first glass sheet of 1.8 mm and a thickness of the second glass sheet of 1.4 mm, the laminated glazing has a dip in acoustic insulation in a frequency range that is between 6,300 Hz and 8,000 Hz.

2. The glazing of claim 1, wherein the loss factor 172 is greater than 0.30.

3. The glazing of claim 1, wherein the measurement of the mechanical impedance is performed at least one month after assembly of the laminated glazing bar, the laminated glazing bar having itself been assembled at least one month after the manufacture of the interlayer.

4. The glazing of claim 1, wherein the thickness of the first glass sheet is in a range of from 1.4 to 2.0 mm.

5. A motor vehicle comprising the glazing of claim 1, wherein the first glass sheet is configured to be turned facing the exterior of the vehicle, and
wherein the second glass sheet is configured to be turned facing the interior of the vehicle.

6. A vehicle windscreen, comprising:
the glazing of claim 1.

7. The glazing of claim 1, further comprising:
a second inner layer consisting of polyvinyl butyral and at least one plasticizer with vibro-acoustic damping properties,
wherein the outer layers each directly contact one of the two inner layers and the inner layers contact each other on one side and one of the two outer layers on the other side.

8. The glazing of claim 1, wherein the resonant frequency $f_2$ is in a range of from 800 to 850 Hz.

9. The glazing of claim 1, wherein the thickness of the second glass sheet is in a range of from 1.1 to 1.5 mm.

10. The glazing of claim 1, wherein the thickness of the first glass sheet is no more than 2.0 mm, and the thickness of the second glass sheet is no more than 1.5 mm.

11. The glazing of claim 1, wherein the total thickness of the glass sheets is no more than 3.2 mm.

12. The glazing of claim 1, wherein the total thickness of the glass sheets is at least 2.5 mm.

13. The glazing of claim 1, wherein the loss factor 112 of the second resonance mode is a range of from 0.27 to 0.33.

14. The glazing of claim 1, wherein the loss factor 112 of the second resonance mode is less than 0.32.

15. The glazing of claim 1, wherein the inner layer consists of polyvinyl butyral and plasticizer.

16. The glazing of claim 1, consisting of the outer layers and the inner layer, wherein the inner layer consists of polyvinyl butyral and at least one plasticizer.

17. The glazing of claim 1, wherein for the total glass thickness of 3.2 mm and for the thickness of the first glass sheet of 1.8 mm and the thickness of the second glass sheet of 1.4 mm, the laminated glazing has a maximum in acoustic insulation in a frequency range between 4,000 Hz and 5,000 Hz.

18. A laminated glazing, comprising:
a first glass sheet having a thickness in a range of from 0.5 to 2.6 mm;
a second glass sheet having a thickness in a range of from 0.5 to 1.6 mm, a total thickness of the glass sheets being less than 3.7 mm;
a viscoelastic plastic interlayer between the first and second glass sheets
wherein the interlayer is incorporated between two glass sheets to form the laminated glazing with vibro-acoustic damping properties,
wherein the interlayer comprises:
an inner layer made of viscoelastic plastic with vibro-acoustic damping properties, and two outer layers consisting of standard PVB, the at least one inner layer being between the two outer layers,
wherein a resonant frequency $f_2$ of the second resonance mode of a laminated glazing bar with a surface area of 25 mm×300 mm composed of two glass sheets each 2.1 mm thick, between which is incorporated the interlayer, determined by measuring the mechanical impedance (MIM) at 20° C. according to standard ISO 16940, is in a range of from 800±15 Hz to 900 Hz,
wherein the loss factor 112 of the second resonance mode of the laminated glazing bar, determined by MIM under the same conditions, is in a range of from 0.25 to 0.33,
wherein the inner layer is based on polyvinyl butyral and plasticizer,
wherein the inner layer is less rigid than the two outer layers, and
wherein for a total glass thickness of 3.2 mm and for a thickness of the first glass sheet of 1.8 mm and a thickness of the second glass sheet of 1.4 mm, the laminated glazing has a dip in acoustic insulation in a frequency range that is between 6,300 Hz and 8,000 Hz.

19. The glazing of claim 18, wherein the inner layer consists of polyvinyl butyral and plasticizer,
wherein the resonant frequency $f_2$ is 800±15 Hz, and
wherein the loss factor 112 of the second resonance mode is a range of from 0.25 to 0.33.

20. The glazing of claim 18, consisting of the outer layers and the inner layer,
wherein the inner layer consists of polyvinyl butyral and plasticizer,
wherein the resonant frequency $f_2$ is 800±15 Hz, and
wherein the loss factor 172 of the second resonance mode is a range of from 0.27 to 0.33.

21. The glazing of claim 18, consisting of the outer layers and the inner layer,
wherein the inner layer consists of polyvinyl butyral and plasticizer,
wherein the resonant frequency $f_2$ is 800±15 Hz,
wherein the loss factor 112 of the second resonance mode is a range of from 0.27 to 0.33, and
wherein the total thickness of the glass sheets is in a range of from 2.5 to 3.2 mm.

* * * * *